(12) United States Patent
Selinfreund

(10) Patent No.: US 7,368,221 B2
(45) Date of Patent: May 6, 2008

(54) CHANGING LIGHT ABSORPTION BY DISRUPTION OF CONJUGATION

(75) Inventor: Richard H. Selinfreund, Clinton, CT (US)

(73) Assignee: Verification Technologies, Inc., Essex, CT (US)

( * ) Notice: Subject to any disclaimer, the term of this patent is extended or adjusted under 35 U.S.C. 154(b) by 0 days.

(21) Appl. No.: 11/234,038

(22) Filed: Sep. 23, 2005

(65) Prior Publication Data

US 2006/0078707 A1    Apr. 13, 2006

Related U.S. Application Data

(63) Continuation-in-part of application No. 11/113,516, filed on Apr. 25, 2005, and a continuation-in-part of application No. 10/715,226, filed on Nov. 17, 2003, now Pat. No. 7,176,308, which is a continuation of application No. 10/641,784, filed on Aug. 15, 2003, now Pat. No. 6,952,392, which is a continuation-in-part of application No. 10/418,898, filed on Apr. 17, 2003, now abandoned.

(60) Provisional application No. 60/612,822, filed on Sep. 24, 2004, provisional application No. 60/393,397, filed on Jul. 2, 2002, provisional application No. 60/391,857, filed on Jun. 26, 2002, provisional application No. 60/391,773, filed on Jun. 25, 2002, provisional application No. 60/390,647, filed on Jun. 21, 2002, provisional application No. 60/389,223, filed on Jun. 17, 2002.

(51) Int. Cl.
*G11B 7/24* (2006.01)

(52) U.S. Cl. ............... 430/270.11; 430/945; 428/64.8; 369/286

(58) Field of Classification Search ............. None
See application file for complete search history.

(56) References Cited

U.S. PATENT DOCUMENTS

| | | | |
|---|---|---|---|
| 3,641,016 A * | 2/1972 | Korosi et al. | 544/37 |
| 5,464,673 A * | 11/1995 | Watanabe et al. | 428/65.1 |
| 5,815,484 A | 9/1998 | Smith et al. | |
| 5,963,536 A | 10/1999 | Vasic et al. | |
| 6,011,772 A | 1/2000 | Rollhaus et al. | |
| 6,228,440 B1 | 5/2001 | Dailey et al. | |
| 6,338,933 B1 | 1/2002 | Lawandy et al. | |

(Continued)

FOREIGN PATENT DOCUMENTS

EP    1293574    *    9/2002

(Continued)

OTHER PUBLICATIONS

Wainwright et al., "Phenothiazine photosensitizers: part 2. 3,7-bis(arylamino)phenothiazines", Dye and Pigments, vol. 42 pp. 45-51 (1999).*

(Continued)

*Primary Examiner*—Martin Angebranndt
(74) *Attorney, Agent, or Firm*—Kelley Drye & Warren LLP

(57) ABSTRACT

Copy-protected optical medium utilizing a composition comprising a transient optical state change security materials constrained to change the optical state light absorption at a wavelength of about 400 nm and an electron transfer agent.

3 Claims, 5 Drawing Sheets

U.S. PATENT DOCUMENTS

| | | |
|---|---|---|
| 6,589,626 B2 | 7/2003 | Selinfreund et al. |
| 6,638,593 B2 | 10/2003 | Selinfreund et al. |
| 6,641,886 B1 | 11/2003 | Bakos et al. |
| 6,733,950 B2 | 5/2004 | Breitung et al. |
| 6,756,103 B2 | 6/2004 | Thompson et al. |
| 6,952,392 B2 * | 10/2005 | Vig et al. ............... 369/275.2 |
| 2002/0067674 A1 | 6/2002 | Schneck et al. |
| 2003/0219124 A1 | 11/2003 | Selinfreund et al. |
| 2004/0004922 A1 | 1/2004 | Selinfreund et al. |
| 2004/0110088 A1 | 6/2004 | Vig et al. |
| 2004/0121262 A1 | 6/2004 | Selinfreund et al. |
| 2004/0152017 A1 | 8/2004 | Vig et al. |
| 2005/0107607 A1 | 5/2005 | Vig et al. |

FOREIGN PATENT DOCUMENTS

| | | | |
|---|---|---|---|
| JP | 55-079441 | * | 6/1980 |
| JP | 60-213938 | * | 10/1995 |
| WO | 01-228976 A | | 9/1989 |
| WO | 08-1228836 A | | 5/1996 |
| WO | WO 98/08180 | | 2/1998 |
| WO | WO 02/03386 | | 1/2002 |
| WO | 02/096896 | * | 12/2002 |

OTHER PUBLICATIONS 3 pages from JPO website illustrating how to find a reference using the published application number.*

J. Daneke and H.W. Wanzlick,. Liebigs Ann. Chem. 740, pp. 52-62 (1970).

Strekowski, et al., "A Synthetic Rout to 3-(dialkylamino)phenothiazin-5-iurn salts . . . ," J. Heterocyclic Chem., vol. 30(6) pp. 1693-1695 (1993).

Chandra, et al., "Studies on Some New Phenothiazines," Can. J. Chem., (1967) vol. 45, pp. 761-767.

Saraf, et al., "Recent Advances in the Synthesis of Phenothiazines," Hetrocycles, (1987) vol. 26 (1), . pp. 239-273.

Cauquil, et al., "No 195-Recherches dans la serie de la . . . ," Bull. Sco. Chim. France, (1955) pp. 1061-1075.

Daneke, et al., "Addition von Nucleophilen an in situ erzeugtes Phenazithionium Kation," Liebigs Ann. Chem., vol. 740, pp. 52-62 (1970).

Morrison & Boyd, "Organic Chemistry," Third Edition (1973), p. 360.

Mellish, et al., (Photochemistry and Photobiology, 2002, 75(4): pp. 392-397.

Taylor, Kenneth, Journal of Histochemistry and Cytochemistry (1960), 8, pp. 248-257.

* cited by examiner

CHANGING LIGHT ABSORPTION BY
DISRUPTION OF CONJUGATION

CROSS-REFERENCE TO RELATED
APPLICATIONS

This application claims priority from U.S. Provisional Patent Application Ser. No. 60/612,822, filed Sep. 24, 2004, and is a continuation-in-part application of U.S. patent application Ser. No. 11/113,516, filed Apr. 25, 2005, which is a continuation application of U.S. patent application Ser. No. 10/641,784, filed Aug. 15, 2003 now U.S. Pat. No. 6,952,392, which is a continuation-in-part application of U.S. patent application Ser. No. 10/418,898, filed Apr. 17, 2003 now abandoned, which claims priority to U.S. Provisional Patent Application Nos. 60/389,223 (expired), filed Jun. 17, 2002, 60/390,647 (expired), filed Jun. 21, 2002, 60/391,773 (expired), filed Jun. 25, 2002, 60/391,857 (expired), filed Jun. 26, 2002, and 60/393,397 (expired), filed Jul. 2, 2002; and a continuation-in-part of U.S. patent application Ser. No. 10/715,226, filed Nov. 17, 2003 now U.S. Pat. No. 7,176,308, which is a continuation-in-part application of U.S. patent application Ser. No. 10/641,784, which is a continuation-in-part of U.S. patent application Ser. No. 10/418,898, which claims priority to U.S. Provisional Patent Application Nos. 60/389,223 (expired), filed Jun. 17, 2002, 60/390,647 (expired), filed Jun. 21, 2002, 60/391,773 (expired), filed Jun. 25, 2002, 60/391,857 (expired), filed Jun. 26, 2002, and 60/393,397 (expired), filed Jul. 2, 2002. To the extent not inconsistent with the disclosure herein, each of such disclosures are hereby incorporated by reference in their entirety.

BACKGROUND OF THE INVENTION

I. Field of the Invention

The present invention generally relates to transient optical state change security materials reactive to a wavelength of about 400 nm to about 780 nm, in particular to wavelengths suitable in HD-DVD optical discs, and which further may be made reactive to the wavelengths produced by CD optical readers. Such materials may be used by directed application to optical media to effectuate copy-protection. More specifically, the materials may be used to manufacture optically readable digital storage high density-DVD media that protects the information stored thereon from being copied using conventional optical media readers, but permits reading of the information from the digital storage media by the same readers.

II. Description of the Related Art

Data are stored on optical media in the form of optical deformations or marks placed at discrete locations in one or more layers of the medium. Such deformations or marks effectuate changes in light reflectivity. To read the data on an optical medium, an optical medium player or reader is used. An optical medium player or reader conventionally shines a small spot of laser light, the "readout" spot, through the disc substrate onto the data layer containing such optical deformations or marks as the medium or laser head rotates. Two common types of optical media are the CD disc, providing a maximum storage space of about 650 megabytes of data on a single-side (SS), single-layer-(SL)_disc, and the DVD disc providing about 4.37 GB (1 GB=$2^{31}$ bytes) on a single-sided (SS), single-layer (SL) disc. The ECMA Technical Committee TC31was established in 1984 for the standardization of Optical Discs and Optical Disc Cartridges, making contributions to ISO/IEC SC23 with respect to International Standards.

The vast majority of commercially-available software, video, audio, and entertainment pieces available today are recorded in read-only optical format. One reason for this is that data replication onto read-only optical formats is significantly cheaper than data replication onto writable and rewritable optical formats. Another reason is that read-only formats are less problematic from a reading reliability standpoint. For example, some CD readers/players have trouble reading CD-R media, which have a lower reflectivity, and thus requires a higher-powered reading laser, or one that is better "tuned" to a specific wavelength.

In conventional "read-only" type optical media (e.g., "CD-ROM"), data are generally encoded by a series of pits and lands that are metallized. A readout spot directed from the non-metallized side is reflected in a manner that the light of readout spot is reflected back into a photosensor in the reader. When referenced from the laser reading side, pits are technically referred to as bumps. The transitions between pits and lands, and the timing in between such transitions, represent channel bits. Thus the pit and lands in themselves are not representations of a sequence of zeros or ones. Typically, in CDs 14 channel bits make up a data symbol that translates to an 8 bit data value, in a process referred to as 8 to 14 modulation (EFM). DVD uses a modified version of EFM, known as EFM+ to convert 8-bit data directly into 16 channel bits. The NRZI (non-return to zero inverted) waveform representation is used to interpret the binary sequence on the disc.

Microscopic pits formed in the surface of the plastic medium are arranged in tracks, conventionally spaced radially from the center hub in a spiral track originating at the medium center hub and ending toward the medium's outer rim. The pitted side of the medium is conventionally coated with a reflectance layer such as a thin layer of aluminum or gold. The "pits" as seen from the metallized side, are also referred to "bumps" when referencing view from the laser-read side. A lacquer layer is typically coated on the pit side as a protective layer.

The intensity of the light reflected from a read-only medium's surface measured by an optical medium player or reader varies according to the presence or absence of pits along the information track. As defect-induced errors may interfere with read, all optical discs employ error management strategies to eliminate the effect of such errors.

The optical reader, such as the CD or DVD reader, has the job of finding and reading the data stored as bumps on the disc. In a conventional player a drive motor spins the disc. A laser and lens system focus light on the bumps, and an optical pickup head (PUH) receives reflected light. A tracking mechanism moves the laser assembly so that the laser's beam can follow the spiral track, conventionally moving the laser outward from the center as the disc is played. As the laser moves outward from the center of the disc, the bumps move past the laser faster, as the speed of the bumps is equal to the radius times the speed at which the disc is revolving (rpm). A spindle motor is conventionally employed to slow the speed of the disc when the laser is reading further and further out from the center of the disc permitting the laser to read at a constant speed, such that the data are read from the disc at a constant speed.

The semiconductor laser utilized, the spread of its wavelength, and its operational temperature affect the wavelength read by the pick up head (PUH) of the reader. DVD readers presently utilize lasers that produce a wavelength of about 630 to about 660 nm, with standard DVD readers measuring a wavelength of 650±5 nm and standard DVD-R readers measuring a wavelength of 650+10/−5 nm. As would be understood by one of skill in the art, the PUHs can detect only those reflected beams that fall within a certain angular deviation from the incident beam. For example, a typical DVD-R requires that the radial deviation be no more than ±0.80° and tangential deviation no more than ±0.30°.

Optical media of all types have greatly reduced the manufacturing costs involved in selling content such as software, video and audio works, and games, due to their small size and the relatively inexpensive amount of resources involved in their production. They have also unfortunately improved the economics of the pirate, and in some media, such as video and audio, have permitted significantly better pirated-copies to be sold to the general public than permitted with other data storage media. Media distributors report the loss of billions of dollars of potential sales due to high quality copies.

Typically, a pirate makes an optical master by extracting logic data from the optical medium, copying it onto a magnetic tape, and setting the tape on a mastering apparatus. Pirates also sometimes use CD or DVD recordable medium duplicator equipment to make copies of a distributed medium, which duplicated copies can be sold directly or used as pre-masters for creating a new glass master for replication. Hundreds of thousands of pirated optical media can be pressed from a single master with no degradation in the quality of the information stored on the optical media. As consumer demand for optical media remains high, and because such media are easily reproduced at a low cost, counterfeiting has become prevalent.

WO 02/03386 A2, which asserts common inventors to the present application, discloses methods for preventing copying of data from an optical storage medium by detecting optical dis-uniformities or changes on the disc, and/or changes in readout signal upon re-reading of a particular area on the optical storage medium, in particular those caused by light-sensitive materials, such as dyes, which may affect the readout wavelength by absorbing, reflecting, refracting or otherwise affecting the incident beam. Software control may be used to deny access to content if the dis-uniformity or change in read signal is not detected at the position on the disc wherein the dis-uniformity or change is anticipated. The disclosure of WO 02/03386 A2 is incorporated herein in its entirety by reference.

A preferred embodiment described in publication WO 02/03386 A2 comprises light-sensitive materials are optically-changeable security materials that are positioned upon the optical disc in a manner that they do not adversely affect the data-read of the readout signal in one optical state but upon exposure to the wavelength of the optical reader incident beam covert to a second optical state, preferably in a time-delayed fashion, that does affect the data-read of the readout signal. In a preferred embodiment described in WO 02/03386 A2, the optically-changeable security material only transiently changes optical state and its optical state reverts over time.

It has been discovered by the present inventors that the optimal characteristics for such transient optically-changeable security materials described in publication WO 02/03386 A2 depend upon a number of factors, including, the characteristics of the incident beam generated by the laser reader used (such as the beam intensity and wavelength), the particular materials used to fabricate the optical disc in particular with respect to the optical characteristics of such materials with respect to the reading beam (such as refractive index and birefringence), the particular formatting of the disc (such as pit depth), where the optically-changeable security material is positioned on or within the disc (e.g., on the surface versus in a layer of the disc/in the data section of the disc versus), the optical characteristics of other materials that may be introduced to effectuate incorporation of the optically-changeable security material onto or into the disc, the characteristics of the pickup head (PUB) of the optical reader in particular with respect to readout wavelength and angle of deviation permitted for pickup of reflected light emanating from the incident beam, the reading characteristics of the optical reader system in particular related to scan velocity, the time for re-scan, and rotational speed of the disc. For example, the material should not change state too quickly so as not to allow the PUH to observe both states. On the other hand, it should not change state too slowly so as to eventuate in a disc that would take non-commercially acceptable times for validation of the disc and read.

Unexpectedly the present inventors have also discovered that the dye composition can effectuate a lambda shift, in particular a red shift, if the dye molecules aggregate in the coating. For example, methylene blue which has an absorption at 650 in aqueous medium, is found to absorb at 600 nm in a typical DVD coating. Aggregation may be caused by the stereochemical structure of the dye substance utilized. The effect of the dye system on the overall coating thickness has also been unexpectedly found to affect jitter, wobble and playback fidelity of an optical disc.

An optimal transient optical state change security material should be thermally and photochemically stable under conditions of optical use and at ambient conditions for a significant period of time. It should be soluble in a matrix that comprises the disc, or that can be adherently-applied to the disc. An optimal transient optical state change security material should revert to its state without the need for extraneous inputs of energy, and should demonstrate a change in optical state at the incident wavelength of the reader.

There is a need for optical state change security materials that may be employed in a manner described in WO 02/03386 A2 to effectuate copy-protection of optical discs, in particular DVDs and CDs, that conform to ISO/IEC standards when read by their respective ISO/IEC standardized readers.

Moreover, now that the era of high-definition programming is on the horizon, with the advent of blue lasers, there are two major systems under development as suitable for reading and recording high density DVD medium formats replacing the present DVDs. One system is the HD-DVD format and the competing other is Blue-ray DVD. Consequently, there is a need for identifying materials that may be used in such copy protection methodologies without requiring modification to optical medium readers.

DEFINITIONS

"Data Deformation": a structural perturbation on or in an item that represents stored data and can be read by an optical reader "Dye": an organic material detectable by optical means.

"Fabry-Perot Interferometer": an Interferometer making use of multiple reflections between two closely spaced reflective surfaces, and typically has a resolvance of $\lambda/\Delta\lambda = m\pi/1-r$.

"HD DVD" and "Blue-Ray" are newly introduced technologies for high definition DVD read via blue laser means.

"Interferometer": a device employing two or more reflective surfaces to split a beam of light coming from a single source into two or more light beams which are later combined so as to interfere in a constructive or destructive manner with each other.

"Optical Medium": a medium of any geometric shape (not necessarily circular)that is capable of storing digital data that may be read by an optical reader.

"Optical Reader": a Reader (as defined below) for the reading of Optical Medium.

"Optical State Change Security Material": refers to an inorganic or organic material used to authenticate, identify or protect an Optical Medium by changing optical state from a first optical state to a second optical state.

"Permanent Optical State Change Security Material": refers to a Transient Optical State Change Security Material that undergoes change in optical state for more than thirty times upon read of the Optical Medium by an Optical Reader.

"Reader": any device capable of detecting data that have been recorded on an optical medium. By the term "reader" it is meant to include, without limitation, a player. Examples are CD and DVD readers. More specifically the development of HD and Blue-ray DVD formats also brings increased use of blue light lasers replacing the presently prevalent red light lasers.

"Read-only Optical Medium": an Optical Medium that has digital data represented in a series of pits and lands.

"Recording Layer": a section of an optical medium where the data are recorded for reading, playing or uploading to a computer. Such data may include software programs, software data, audio files and video files.

"Re-read": reading a portion of the data recorded on a medium after it has been initially read.

"Transient Optical State Change Security Material": refers to an inorganic or organic material used to authenticate, identify or protect an Optical Medium by transiently changing optical state between a first optical state and a second optical state and that may undergo such change in optical state more than one time upon read of the Optical Medium by an Optical Reader in a manner detectable by such Optical Reader.

"Temporary Optical State Change Security Material": refers to an Optical State Change Security Material that undergoes change in optical state for less than thirty times upon read of the Optical Medium by an Optical Reader.

For the purpose of the rest of the disclosure, it is understood that the terms as defined above are intended whether such terms are in all initial cap, or not.

SUMMARY OF THE INVENTION

The present invention provides material and materials systems that may be optimized to exhibit a reversible transient change in optical state which is detectable by a reader upon exposure of such materials, e.g., dyes, and material systems to a wavelengths of about 400 to about 780 nm. When such reversible transient change materials are used to form copy protected recording media, such as disclosed in WO 02/03386 A2 (discussed above), the persistence of the change (i.e., the time period during which the material remains in the altered optical state before changing back to the initial optical state) may be advantageously less than a minute, or more advantageously in the millisecond, microsecond, nanosecond range, or less than a nanosecond. In one embodiment, persistence in the nanosecond range may be found to be quite useful given optical reader parameters. More specifically, an absorbance of such dyes may be induced to shift from about 780 nm to about 400 nm and back The reversible down shift renders them suitable for use in HD DVD and Blue-Ray devices. Such dyes and dye systems are applied in a manner to result in a transient optical state change security material providing for a change in optical state that can be repeated numerous times upon exposure to/and removal from such wavelength Such dyes and/or dye compositions do not shift appreciably with respect to activation wavelengths when placed within the coating of an optical disc.

In one dye system embodiment, the dye system on an optical disc comprises: (1) a dye that rapidly changes optical state from a first unactivated optical state to a second activated optical state in response to a wavelength of about 780 to about 400 nm which is detectable by the uptake head of an optical reader when the dye is in its second optical state, but not the dye is in its first optical state; (2) a dye-carrying polymer in which the dye is dispersed; and (3) a material that aids in reducing the reversal time of the dye from its second activated optical state back to its first unactivated optical state. Optionally such system may also comprise a material that aids in reducing the time to the second activated optical state from the first unactivated optical state. The optical state change may be in any optically measurable manner, for example in causing a change in reflection and/or refraction, as long as the optical change can be detected. For example, in one embodiment the dye/dye system changes the percent reflectance on the optical disc by approximately 25% to approximately 30% which may be seen to be sufficient for detection at the pickup head.

One embodiment of this disclosure is found in the molecule "A" which may suitably achieve an absorption at about 400 nm, wherein R1 and/or R2 may independently represent electron withdrawing or electron donating groups, or both groups may be either withdrawing or electrons donating groups. In an embodiment the R1, R2 groups are chosen to disrupt conjugation in the ring to move light absorption to a higher energy level or shorter wavelength.

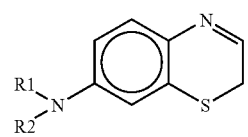

A

Another embodiment of this disclosure is found in the molecule "B" which may suitably achieve an absorption at about 400 nm wherein R3 and/or R4 may independently represent electron withdrawing or electron donating groups, or both may represent either electron withdrawing or electron donating groups. In an embodiment, the R3, R4 groups are chosen to disrupt conjugation in the ring to move light absorption to a higher energy level or shorter wavelength.

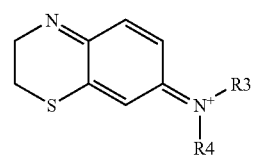

B

According to one embodiment, a particularly useful class of dyes is based on a methylene blue analog core compound that for example is capable of being activated from a wavelength of about 780 nm to a lower wavelength of about 408 nm that have been identified are:

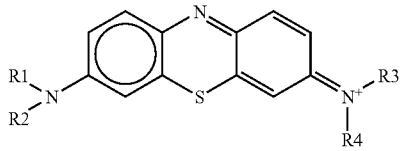

where $R_1$, $R_2$, $R_3$, and $R_4$ independently comprise electron withdrawing and/or electron donating radical groups, all are election withdrawing or election donating groups, or $R_1$, $R_2$ are either electron withdrawing or electron donating groups and $R_3$, $R_4$ are the group not represented by $R_1$, $R_2$ (electron withdrawing or electron donating). In an embodiment, $R_1$, $R_2$, $R_3$, and $R_4$ are selected to disrupt conjugation in the ring to move light absorption to a higher energy level or shorter wavelength.

Such dye substances can be incorporated into a dye system which comprises an electron donor agent (ED)/ electron transfer agent ('ETA'). Such compounds are electron rich and provide electrons to the dye molecule for example as the dye molecule is reduced to the corresponding leuco form. In the presence of laser light, this phenomenon may be referred to as photoreduction (P-R).

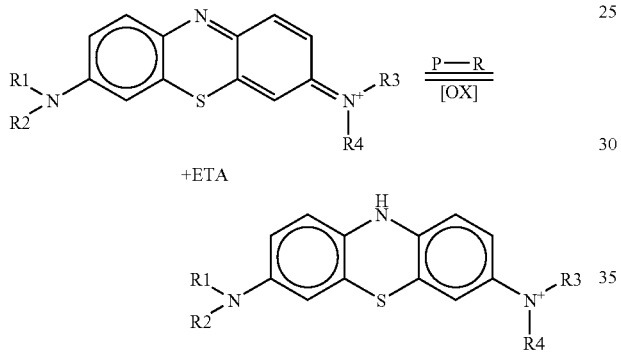

Non-limiting examples of ETAs which may be incorporated into the dye system include triethanol amine, diethanol amine, trimethylglycine (TMG), dimethylaminoethanol (DMEA), diethylmethylaminoethanol (DEMEA), tetramethylethylenediamine (TMED), ethylenediamine tetraacetic acid (EDTA), bis(2hydroxyethyl)iminotris(hydroxymethyl) methane (Bis-Tris), p-tolylimido diethanol, N-tert-butyldiethanol amine, 4-morpholine ethanol, 1,4-bis-2-hydroxyethyl piperazine, bicine, N,N-bis(2-hydroxyethyl)-2-aminoethanesulfonic acid (BES), 3-pyrrolidino-1,2-propanediol, 1-amino-3,3-diethoxypropane, (S)-3-tert-butylamino-1,2-propanediol, DL-isoproterenol sulfate dihydrate, N,N-Bis(2-hydroxyethyl)-3-methoxyaniline, 1,1'-[[3-(dimethylamino) propyl]imino]bis-2-propanol, triethanolamine ethoxylate, 2,2'-(4-methylphenylimino)diethanol, triisopropanolamine, 2-[[2-[2-(dimethylamino)ethoxy]ethyl]methylamino]ethanol, triethanolamine hydrochloride, N-phenyldiethanolamine, 1-[N,N-bis(2-hydroxyethyl) amino]-2-propanol, N-t-butyldiethanolamine, N-butyldiethanolamine, 3-morpholino-1,2-propanediol, N,N-bis(2-hydroxyethyl) ethylenediamine, 3-(diethylamino)-1,2-propane -diol, 4-(3-hydroxypropyl)morpholine, N-ethyldiethanolamine, 4-(2-hydroxyethyl)-morpholine, N-methyldiethanolamine, 3-morphonlino-1,2-propanediol, 3-diisopropyl-amino-1,2-propanediol, 3-(dimethylamino)-1,2-propanediol, 3-piperidino-1,2-propanediol, 3-(diethylamino)-1,2-propanediol, dropropizine. The ETA may be incorporated into the polymeric base of a dye system physically or chemically. For example, a useful ETA may be bound to the repeating polymeric unit. For example, a compound of the following structure has been found to be a useful ETA:

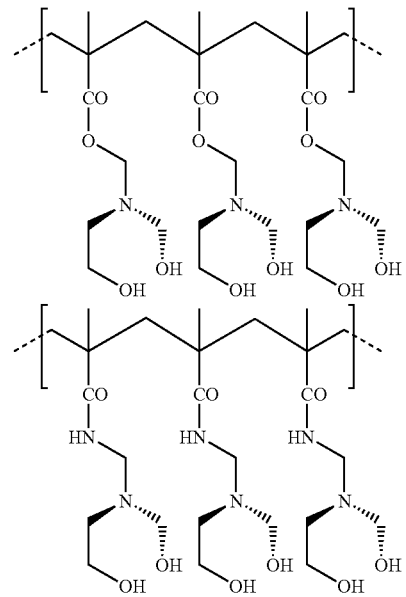

as well as other compounds comprising a polymer having a bis(2-hydroxy ethyl) amino functionality. A preferred polymer may be in the molecular weight range of 50-100 k.

Other non-oxygen associated ETAs may be used, such as a combination of reductants such as Fe (II)-Fe (III).

The dye and/or dye system may be used on an optical disc to effectuate data changes on the disc, which may be at the bit level code. As described in the applications referenced above, a security software can be used to confirm the change in code. The dye/dye system is advantageously placed in a manner on the disc so as not to alter playability on industry compliant DVD devices.

An embodiment of the present invention provides reduction of the ring resonance or conjugation to achieve light absorption at higher energy (i.e. frequency) or correspondingly shorter wave length to facilitate blue-violet read.

According to one specific embodiment, the absorption wavelength of the dye compound may be reduced from about 780 nm to about 405 nm.

According to the present disclosure, the conjugation of the ring structures can be disrupted by tilting the plane of the compound causing the absorption wavelength to shorten According to one embodiment of the methylene blue analog,

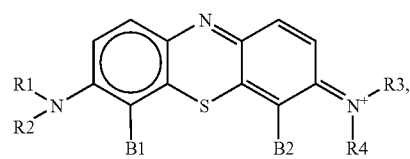

radicals, B1 and/or B2, can be such bulky groups as to disrupt conjugation and thereby shorten the absorption wavelength.

According to another embodiment described below, a methylene blue analog may be in a cross-linked layer

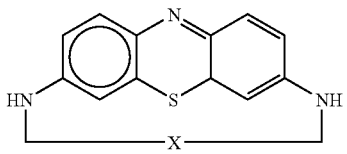

that would constrain the planar aspect of the molecule and consequently shorten it, and disrupt the conjugation of the rings, resulting in a shorter wavelength.

As would be understood by one of ordinary skill in the art, the dyes/dye systems employed on an optical disc may be selected such that they do not decay or degrade in an undesired time and such they are safe.

BRIEF DESCRIPTION OF THE DRAWINGS

The accompanying drawings, which are incorporated in and constitute part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
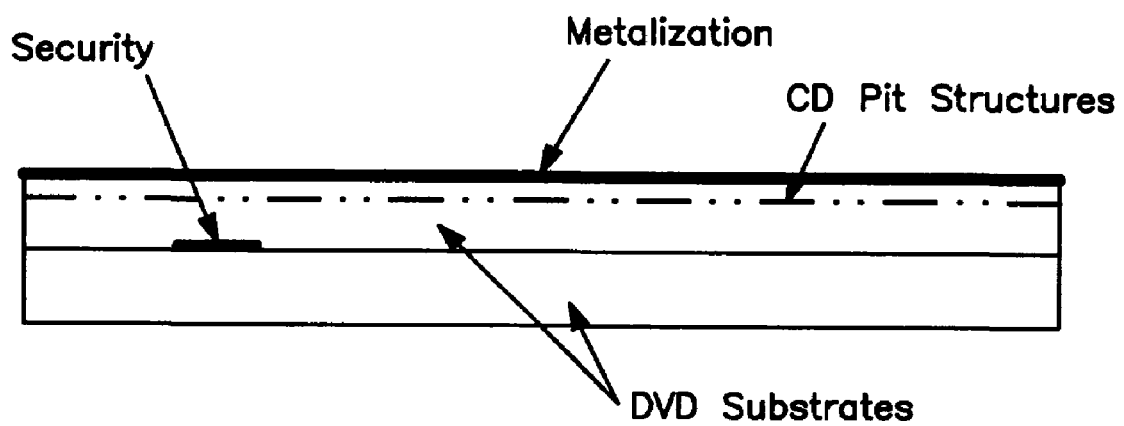
FIG. 1 illustrates a multi-layer optical disc embodiment of the present invention having reflective layer, dye layer, and transparent substrate.

The present invention provides for transient optical state change security materials reactive to a wavelength of about 400 nm, in particular to wavelengths produced by so-called HD DVD or Blu ray DVD optical readers. In general, the laser achievable read wavelengths range from UV to IR The specific wavelengths (nm) include 262, 266, 349, 351, 355, 375, 405, 415, 430, 490, 523, 527, 532, 638, 658, 671, 685, 785, 946, 1047, 1053, 1064, 1313, 1319, and 1340. Many of the blue laser readers are set at 405 nm wavelength although blue-violet laser products presently available have also other wavelengths such as, 473 nm, 415 run, 440 nm, 375 nm and 380 nm, 430 nm and 490 nm Moreover, 473 nm blue laser and 946 nm near infrared laser systems (U.S. Pat. No. 4,809,291) are available. The transient optical state change security materials may be used to manufacture optically readable digital storage medium of HD DVD discs that protects the information stored thereon from being copied using conventional optical medium readers, but permits reading of the information from the digital storage media by the same readers.

The introduction of blue lasers or more specifically blue-violet laser diodes affords an improved light source for high resolution printing and large capacity optical data storage as well as for reading of high definition DVD media.

As disclosed in WO 02/03386 A2, which asserts common inventors to the present application, transient optical state change security materials may be used to effectuate copy-protection of an optical disc by providing a change in optical state upon activation of the material by the incident reading laser beam, that is of such character that upon a second read of the area of the disc where the transient optical state change security material is located a change in data read is detected at the optical pickup head. The materials may be used, for example, to cause an uncorrectable error upon re-read of such a character that the error interferes with copying function of most optical readers that require over-sampling in the copying process, and/or a uncorrectable/correctable error, or a change in interpretation of a data read, that due to an algorithm on the disc, which may be incorporated as an encryption code, and/or an algorithm incorporated into the reader and/or component associated with the reader, is used to authenticate the disc and permit copying only upon authentication.

The materials may also be used to effectuate complementary data sequences (CDSs) both of which are interpreted as valid, both of which are interpreted as erroneous, or one of which is interpreted as valid and the other as erroneous, or one of which is interpreted as erroneous and the other as valid. That is, the for example, the materials may be used to cause a pit to disappear altogether or change its length because part of it disappeared. It may be advantageous that the material be conformal with the data structure. Copy protection may be effected using CDSs by, in one embodiment, for example, having the first valid data read attributable to the material in its unactivated state directing the reader to an erroneous track on the disc, while having the second valid data read attributable to the material in its activated state directing the reader to the correct track for further effectuating of the read. As would be understood, copying of the disc in such situation is hampered by resampling by the copying device (which reads two different valid data reads). When such error is detected, re-seek algorithms internal to the drive will cause the data stored in the tracking control to be re-read. If the transient optical state change security material, which may be temporary or permanent, is in its second state, and the second state is selected as to allow the underlying data to be read, the new address will be correct and the content on the disc will be able to be read. In one embodiment of such "spoofing" technique for copy-protection, the material is placed at the subcode level in the lead-in zone thus effecting the table of contents. The material may be placed at the microlevel in the CRC field. A copy of the disc incorporating data having the first valid data read alone would not work due to the failure of the data to direct subsequent reading to the correct track. The transient optical state change security material may also provide for a valid data state read in a first optical state, but an uncorrectable read error in a second optical state, making it significantly more difficult for a would-be copier of the disc to reproduce an operable disc by incorporating an uncorrectable error, such as a physical deformation, into the disc.

By "correctable error" it is meant an error which is correctable by the ECC used with respect to the optical disc system, while an "uncorrectable error" is an error which is not correctable. ECC are algorithms that attempt to correct errors due to manufacturing defects such that the opticaldisc works as intended. Error detection methods are conventionally based on the concept of parity. All optical discs employ error management strategies to eliminate the effect of defect-induced errors. It has been found that even with the most careful handling, it is difficult to consistently manufacture optical discs in which the defect-induced error rate is less than $10^{-6}$. Optical recording systems are typically designed to handle a bit-error rate in the range of $10^{-5}$ to $10^{-4}$. The size of the defect influences the degree of error associated with the defect. Thus some defects create such a marginal signal disturbance that the data are almost always decoded correctly. Slightly smaller defects might induce errors hardly ever. Macro or micro depositions may also be used to cause correctable or uncorrectable errors. For example, micro depositions may be of such size as to kill a data group that is fixable by $C_1/C_2$ of ECC of a CD, but if applied to kill enough groups may cause an uncorrectable error detectable by such software.

The type of transient perturbation that is desired to be effectuated, whether a correctable error, uncorrectable error, two or more complementary valid data sequences, a valid data sequence and a corresponding invalid data sequence and/or other detectable change at the optical pickup head, will dictate where on the disc the transient optical state change security material will be placed. For example, if a data change detectable by the optical pickup head is desired, the material should not of course be placed in the clamping zone. If there is a valid to valid, or erroneous to erroneous data state change, in order to allow easy detection it is preferred that the data state change causes a change in the values read. In error state to error state changes the level of severity of the errors preferably is different, thereby aiding detectability.

The present invention discloses in embodiments transient optical state change security materials (both temporary optical state change security materials, and permanent optical state change security materials) that change optical state upon exposure to a wavelength utilized by HD DVD and Blu-ray DVD technology. The material, which may comprise a dye or dye system, transiently changes the signal read by the pickup head by changing, for example the reflectivity of the blue laser beam when the material is in its activated state versus its unactivated or quiescent state. Typically, when used for the production of copy protected optical discs, the dye acts to change a detectable parameter, e.g. reflectivity, at a few selected pit/land structures. A typical dye system comprises a dye which changes from a first unactivated optical state at about 630-780 nm to a second, activated optical state at about 400-450 nm upon exposure to a wavelength produced by an HD DVD reader, e.g. from about 780 nm. An electron donor agent or electron transfer agent may aid in the conversion of the activated second optical state back to the unactivated first optical state, and a polymer. The system composition affects the laser activation, the rate and intensity of optical state change in response to an activation wavelength, and the conformal application of the dye/electron donor to the HD DVD disc.

Both Blu-ray and HD DVD systems utilize blue lasers in order to substantially increase the data load per disc. A blue HD DVD read laser has spectra centered about 408 nm wavelength. The absorption spectra for a methylene blue may show an absorption wavelength of 780 nm. The inventors have found that the absorption spectrum of methylene blue may be modified by altering the steric bulk on the nitrogen.

One particularly useful class dyes capable of being activated by a wavelength of about 630 to about 660 nm/that have been identified are:

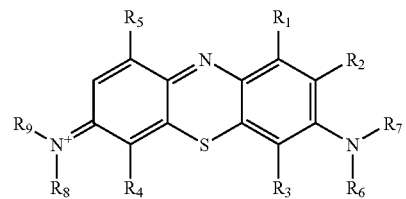

where $R_6$, $R_7$, $R_8$, and $R_9$ are alkylamino and $R_1$, $R_2$, $R_3$, $R_4$ and $R_5$ are select from the group consisting of hydrogen, alkyl, alkoxy, thioalkoxy, alkylamino, nitro, amino and halogen In one preferred embodiment $R_6$, $R_7$, $R_8$, and $R_9$ are each, or independently, propyl or hexyl and $R_1$, $R_2$, $R_3$, $R_4$ and $R_5$ are hydrogen or alkyl.

Preparation of Exemplar Thiazine Compounds Useful for Copy-Protected DVDs

EXAMPLE 1

Propyl and Hexyl Analogs of Methylene Blue

To shift the absorption maxima, propyl (MB-3) and hexyl (MB-61) analogs of methylene blue were synthesized using the procedure described by Mellish et al. as set forth below.

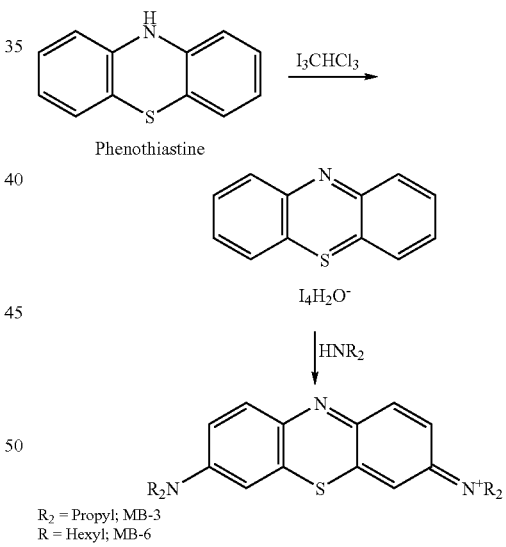

The absorption maxima of the compounds when coated onto optical media was in the expected range and the change in optical state was detectable by the PUH. The optical density of 5% poly-HEMA (poly-2-hydroxyethyl-methacrylate), 250 mg MB-3, and 160 mg Bis-Tris (2-hydroxyethyl) iminotris (hydroxylmethyl)methane) on one disc was 0.22 absorbance units at 650 nm and the optical density on another disc using 325 mg MB-3, 5% poly-HEMA and 160 mg Bis-Tris was 0.3 absorbance units. The disc with optical density of 0.22 absorbance units demonstrated about a 18% photobleach at 650 nm. The disc with optical density 0.32 absorbance units demonstrated about a 30% photobleach at 650 nm. The disc with optical density 0.32 absorbance units demonstrated about a 30% photobleach at 650 nm.

An ETA or ED (electron donor agent) is a compound that is electron rich and provides electrons to the dye molecule that is being reduced to the corresponding leuco form. In the presence of laser light, this phenomenon is called photoreduction (P-R); in the absence of the laser light energy, the oxidation process restores the unactivated state absorption spectrum of the HD DVD-suitable methylene blue compound; e.g.,

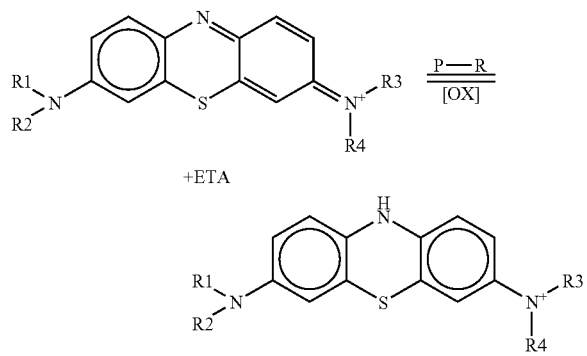

ETAs are particularly useful in a dye system of the present: invention when photoreduction (P-R) is a principle means of optical state change to the unactivated state. ETA's that can be used in this system include, but not limited to, triethanol amine, diethanol amine, trimethylglycine (TMG), dimethylaminoethanol (DMEA), diethylmethylaminoethanol (DEMBA), tetramethy lethylenediamine (TMED), ethylenediamine tetraacetic acid (EDTA), bis(2-hydroxyethyl) iminotris(hydroxymethyl)methane (Bis-Tris), p-tolylimido diethanol, N-tert-butyldiethanol amine, 4morpholine ethanol, 1,4-bis-2-hydroxyethyl piperazine, bicine, N,N-bis(2-hydroxyethyl)-2-aminoethanesulfonic acid (BES), 3-pyrrolidino-1,2-propanediol, 1-amino-3,3-diethoxypropane, (S)-3-tert-butylamimo-1,2-propanediol, DL-isoproterenol sulfate dihydrate, N,N-Bis(2-hydroxyethyl)-3-methoxyaniline, 1,1'-[[3-(dimethylamino)propyl]imino]bis-2-propanol, triethanolamine ethoxylate, 2,2'-(4-methylphenylimino)diethanol, triisopropanolamine, 2-[[2-[2-(dimethylamino)ethoxy]ethyl]methylamino]ethanol, triethanolamine hydrochloride, N-phenyldiethanolamine, 1-[N,N-bis(2-hydroxyethyl) amino]-2-propanol, N-t-butyldiethanolamine, N-butyldiethanolamine, 3-morpholino-1,2-propanediol, N,N-bis(2-hydroxyethyl) ethylenediamine, 3-(diethylamino)-1,2-propane-diol, 4-(3-hydroxypropyl) morpholine, N-ethyldiethanolamine, 4-(2-hydroxyethyl)-morpholine, N-methyldiethanol amine, 3-morphonlino-1,2-propanediol, 3-diisopropyl-amino-1,2-propanediol, 3-(dimethylamino)-1,2-propanediol, 3-piperidino-1,2-propanediol, 3-(diethylamino)-1,2-propanediol, dropropizine. Such ETAs may photobleach the system using a DVD laser on the pulsetec. In general percent photobleach observed may be directly proportional to the amount of ETA added in the system, but there may be a limit to the amount of ETA that can be tolerated in the system after which discs are not playable.

One particularly useful class of dyes is designed to achieve a transient, reversible change from about 780 run to about 400 nm by the disruption of the ring conjugation. Short molecule analogs "A" and "B" of the Methylene blue core (below) or base can achieve absorption at about 400 nm, suitable for Blue Laser reader application

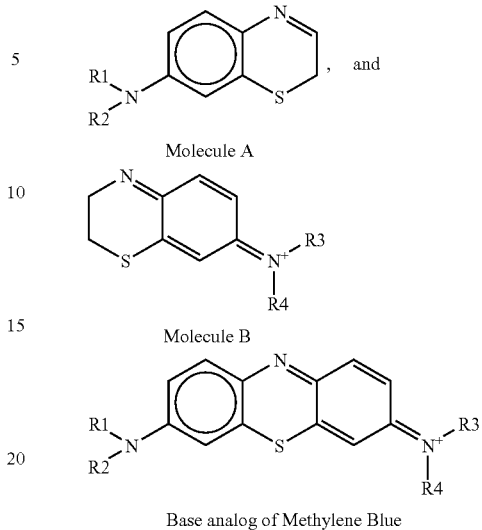

Base analog of Methylene Blue

One way to effect disruption of the conjugation is through the radicals R1 and R2 acting as electron withdrawing groups. At the same time radicals R3 and R4 are selected from electron donating groups. This arrangement tends to push electron resonance counter the core conjugation such that conjugation is reduced, moving energy to absorption with higher energy (E=hv) and thus, shorter wavelength.

For, example,

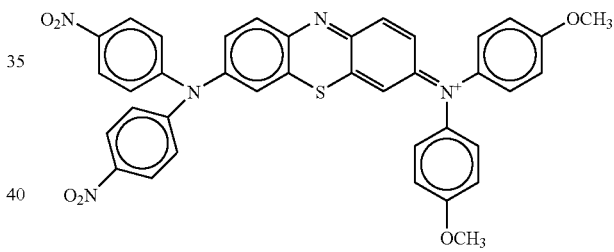

R1 and R2 can be electron withdrawing groups, e.g., para-nitrophenyl; and at the same time R3 and R4 can be electron donating groups, e.g., para-methoxyphenyl;

Thus, as the electrons are pushing the wrong way, there is reduced conjugation which moves energy to an absorption wavelength with higher energy and resulting in a lower wavelength.

Another means for manipulating the base molecule in order to effect a shorter wavelength is constraining the plane of the molecule.

Tilting of the planar ring structure can also be utilized to cause disruption of conjugation so as to shorten the absorption wavelength. This effect can be achieved by adding bulky, saturated, and electron rich groups B1 and/or B2 to a base methylene blue analog.

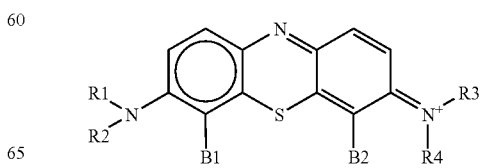

For example, as shown below, B1 and B2 of a methylene blue analog can be in the form of tert-butyl groups, and secondly, as neo-pentyl groups.

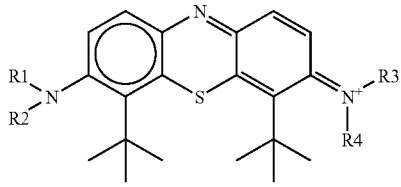

B1/B2=tert butyl

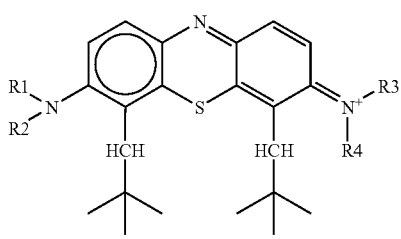

B1/B2=neo-pentyl

The dye molecules such as those based on methylene blue can be subjected to constraints by cross-linking so as to result in shortened absorption wavelengths. As shown below, X can be a cross-linked product which forces a constraint disrupting conjugation by shortening the molecule.

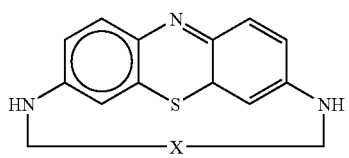

Any of the radicals R1, R2, R3, and R4 of any of the above-disclosed molecules may be in the form of [—OH] substituents to cross-link the molecule to silica or other suitable molecular substrates so as to achieve the desired constraining effect. This cross-linking feature is useful to sputter coat the dye and thereby permit skipping the spin coat step.

Preparation of Exemplar Copy-Protected DVD

EXAMPLE 2

Optical Disc having Dye System Comprising MB-3

250 mg of MB-3 dye was added to a 25 ml 4% polymer solution in 1-methoxy 2-propanol (Aldrich catalog No. 484407) and 150 mg of Bis-Tris was added. The resulting solution was stirred vigorously on a shaker for 30-60 min. The final solution was filtered through a 0.2 pm filter and was used to spin coat optical discs. The spin coater used for this purpose was model P-6708D manufactured by Specialty Coating Systems.

EXAMPLE 3

Optical Disc having Dye System Comprising MB-3

To a 25 ml solution of 4% PolyHEMA (poly-(2-hydroxy-ethyl-methacrylate)) in methoxy propanol was added 300 mg of MB-3 and 150 mg of Bis-Tris. The solution was stirred on a shaker for 30 through 0.2 um filter and the filtered coat discs using a spin coater Disc No. 1854-1857.

EXAMPLE 4

Optical Disc having Dye System Compromising MB-3 and Poly HEMA

To 24.5 ml of methoxy propanol was added a 0.5 ml solution of 10% PolyHEMA in methoxy propanol, 250 mg of MB-3 and 100 mg of Bis-Tris. The solution was stirred on a shaker for 30 min and filtered through 0.2 um filter and filtered solution was used to coat discs using spin coater Disc No. SE1600-1611, 1625-1630, 1650-1652, 1687-1689, 1700-1726, 1750-1773, 1775-1786, 1825-1827, 1850-1852, 1875-1895.

EXAMPLE 5

Optical Disc Having Dye System Comprising MB-3 and 40% Hydrolyzed PVA

To 24.5 ml of methoxy propanol was added a 0.5 ml solution of 10% 40% hydrolysed polyvinylalcohol (PVA) in methoxy propanol, 250 mg of MB-3 and 100 mg of bis(2-hydroxyethyl)iminotris(hydroxymethyl)methane (Bis-Tris). The solution was stirred on a shaker for 30 min and filtered through 0.2 um filter and filtered solution was used to coat discs using spin coater Disc No. SE1856-1858.

A two component dye system is yet another embodiment of the invention. In such system, the ETA is combined chemically with the polymer with polymers that have ETA appended photobleach. Useful electron transfer polymers include, but are not limited to: a) a polymer containing the bis(2-hydoxyethyl) amino functionality as shown below, b) homo-polymers or co-polymers with vinyl acetate or methacrylate containing the (2-hydroxyethyl)amino functionality.

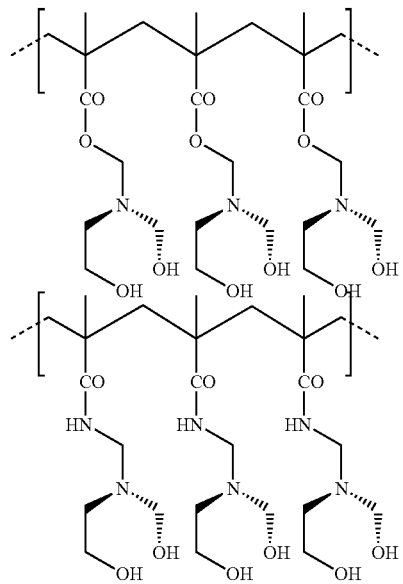

and c) any other polymer in Mol wt. range 50-100K that is soluble in methoxy propanol and having a bis (2-hydroxy ethyl) amino functionality.

EXAMPLE 6

ETA Polymer-Methylene Blue Dye System

Polyethylenimine which was 80% ethoxylated in water was adjusted to a pH of about 8 using concentrated HCl and methylene blue added to bring the absorbance to 3. Photobleach of the system was seen with a simple overhead projector to be in the range of 2-3 seconds with oxidation back to unactivated state in approximately 2-3 minutes.

Combinations of reductants such as Fe (II)-Fe (III) can be used for an oxygen free system. For example, the catalytic effect of ferrous ion on the photochemical bleaching of thionine in the presence of diethylallylthiourea is related to the present work on methylene blue. On irradiating a 0.001% aq. solution of thionine containing 0.0075 mol. per liter, the dye bleaches in 1-2 sec. The color returns again in 1-2 sec. after removal of the light. Similarly the leuco form of the dye will return to the original colored form in the presence of weak-strong oxidizing agents such as bromine or silver halides to name a few.

Figure 2:
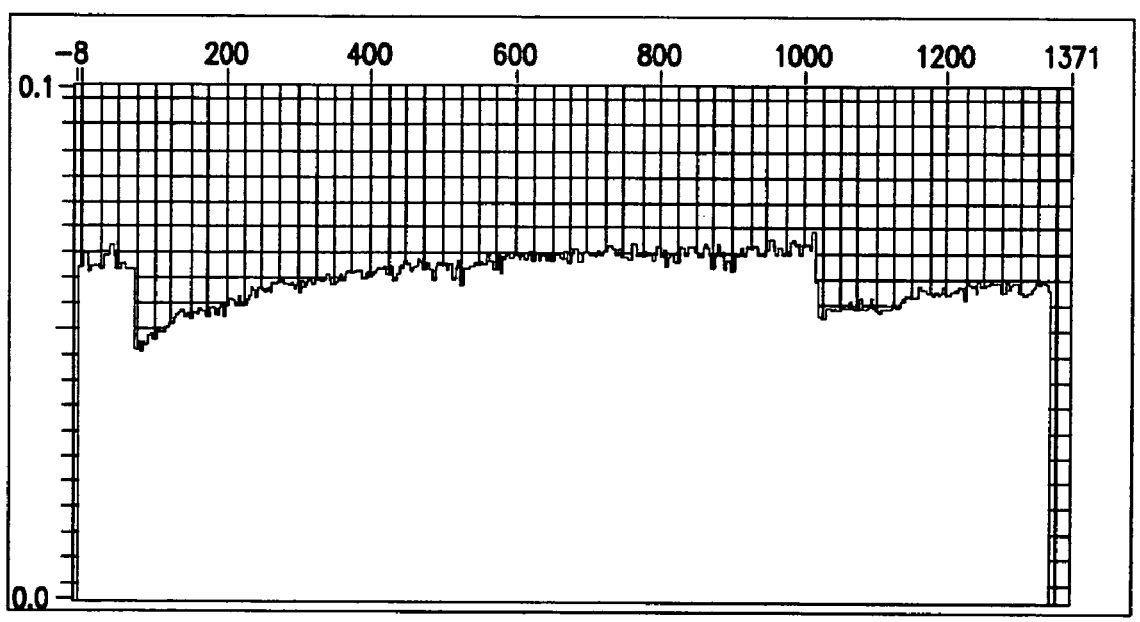
FIG. 2 is a chart of reflectivity versus time in regard to a dye system unexposed to DVD reader laser light, exposed to DVD reader laser light, and recovered from exposure to DVD reader laser light.
Figure 3:
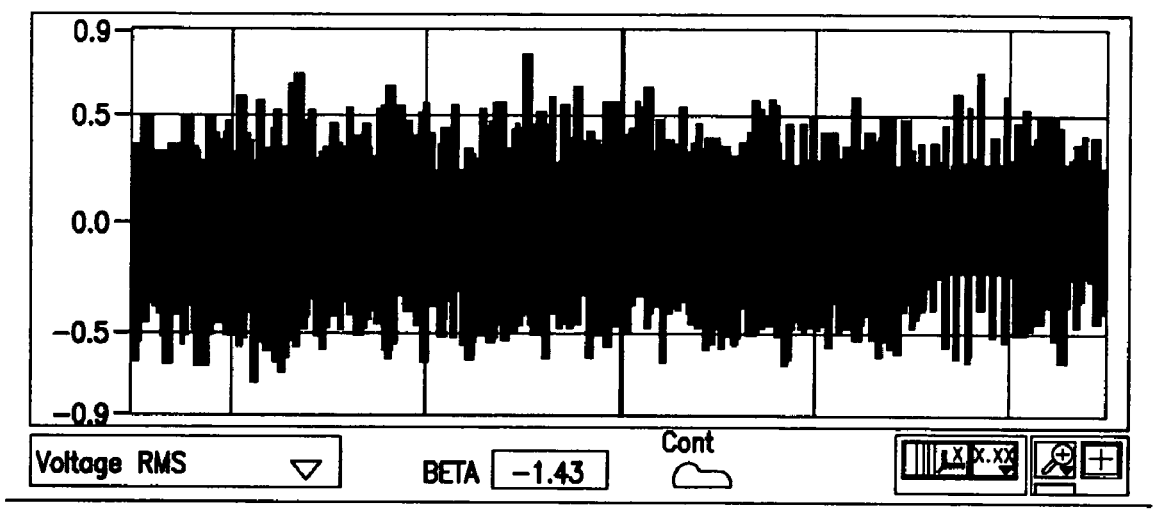
FIG. 3 is a real time plot of pit/land signal with respect to the dye system of FIG. 2.
Figure 4:
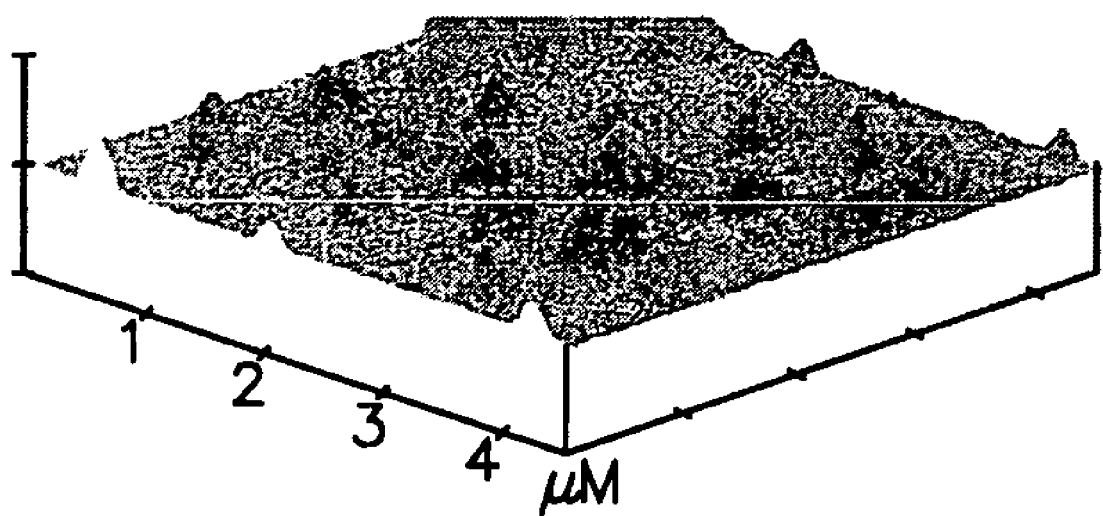
FIG. 4 is an atomic force microscope photo of a multi-depth pit master which may be used to form a multi-depth pit disc.
Figure 5:
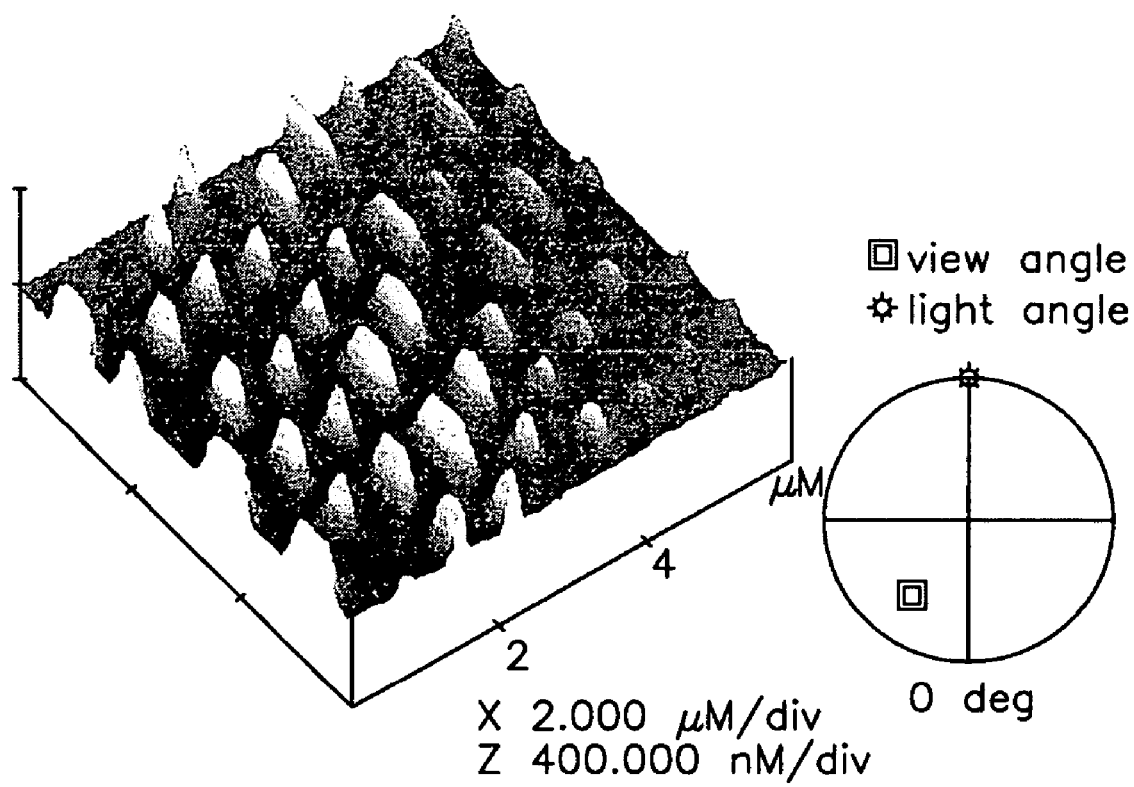
FIG. 5 is an atomic force microscope photo of a multi-depth pit disc with dye/dye system of the present invention being coated on the highest bumps (deepest pits).

Now turning to the figures, FIG. 1 illustrates a cross-section of an optical medium embodiment comprising a transient optical state change security material between two substrates. FIG. 4 is an atomic force microscope photo of a multi-depth pit master which may be used to form a multi-depth pit disc. Such multi-depth pit (i.e. heightened bump) may be useful for easing application of the dye to select pits (bumps from the read side). FIG. 5 is an atomic force microscope photo of an exemplar multi-depth pit disc with dye system of the present invention being coated on the highest bumps (deepest pits). FIG. 2 is a chart of reflectivity versus time in regard to a dye system before and during exposure to a DVD reader laser light, and after it has returned to the unactivated state. FIG. 3 is a real time plot of pit/land signal with respect to the dye system of FIG. 2.

Optimization of transient optical state change security materials for a particular reader is influenced in part by the particular materials used to fabricate each layer of the optical disc itself, and the material's position vis-a-vis such layers and the incident laser beam. It is therefore useful when selecting for such optimal security materials with respect to a particular reader that the material be placed on a disc of similar fabrication and placed for testing purposes in a manner similar to how they are ultimately to be placed.

As disclosed in WO 02/03386 A2, the transient optical state change security materials may be placed anywhere on or within the optical medium so long the PUH can detect the change in optical state. Such security materials may advantageously be placed in or on the optical medium on either the laser incident surface ("LI Method") or the pit/land surface (a.k.a. the focal plane) of the optical medium ("FP Method"). Advantageously, changes in reflectivity, absorbance, optical clarity, and birefringence due to the application of the security materials may be monitored to assure that such materials do not interfere with industry standards, suggestive that the optical medium might not adequately perform in its reader. Audio Development's CD-CATS and DVD-CATS testers may be used to measure servo responses, HF signal amplitudes, and error behaviors.

Surface Application

The transient optical state change security materials may be applied topically to a surface of the optical medium or component of the optical medium during manufacture. Topical surface application may be by any of the imprinting techniques known to those of ordinary skill in the art, including, but not limited, air brush, industrial ink jet printing, desktop ink jet printing, silkscreen printing, sponge/brush application, air brushing, gravure printing, offset lithography, oleophilic ink deposition onto a wetted surface.

The material may also be spin coated. Spin coating a layer comprising the transient optical state change security materials may be a preferred method of application due to precision and uniformity requirements. Only minor process modification are typically necessary to implement in-line deposition by spin coating. The spin coat may be applied using any means known to those of ordinary skill in the art. For example, a precise, small quantity of dye may be placed in a radial line with the disc stationary and the disc subsequently spun to produce a precisely coated area. Conventionally spin coating may entail a first ramp of acceleration to first speed, a first dwell time at first speed, a second ramp of acceleration to second speed, a second dwell time at second speed, a third ramp of acceleration to third speed, a third dwell time at the third speed, deceleration, and post conditioning (baking/drying/curing at defined temperatures for defined periods of time). The spin profile may be advantageously controlled to produce the desired coating. It is preferred that when such security materials are placed on an otherwise exposed surface of the completed optical medium, that the security materials be coated to protect against wear of the security material due to handling of the optical medium. Thus, for example when security material is applied to the laser-incident surface of a completed optical disc, it is advantageous that a hard-coating be placed over the security material to prevent wear or removal of the security dye from such surface.

The transient optical state change security materials maybe coated onto the pit-surface prior to lacquering of the optical medium, addition of a second substrate (DVD) and/or application of any label. The later addition of such materials helps protect against removal and degradation of the security material. Any covering over the security material may further comprise a special filtering material, such as GE filtering polycarbonate.

The transient optical state change security materials may be placed at the pit/land surface.

In one embodiment, pit/land placement may makes use of pit geometries needed to accommodate dye deposition at the focal plane of the disc. Techniques such as Atomic Force Microscopy (AFM) may be used to verify dimensions. Optimal pit geometries for the particular security material may be determined by spin coating the material onto a surface having variable pit depths, determining which pits contain the materials as by, for example, microscopy, and determining which pit dimensions which may hold material after spin coating, actually allow for playback without the dye in them, and without errors. The optical medium with the material and determined pit geometries is then checked to determine whether a dual data state, error to valid, or valid to error, may be produced. Different radii, depths etc. may be investigated.

For example, without any limitation, a variable pit depth glass master for a CD may be made using a 350 nm thick photoresist and LBR (laser beam recorder) power step series, as to form 13 steps in random order, except for nominal depth tracts which contain 50 MB of pseudo-random user data, for example, as follows: 160 nm (nominal pit depth), 120 nm, 150 nm, 180 nm, 160 nm (nominal), 210 nm, 240 nm, 270 nm, 160 nm (nominal), 300 nm, 320 nm, 350 nm, 160 nm (nominal). Similarly, a variable pit depth master for DVD may be made using a 200 nm thick photoresist and LBR power step series, as to form 13 steps in random order except the nominal depth tracks, wherein each track contains 360 MB of pseudo-random user data, for example, as follows: 105 nm (nominal), 80 nm, 95 nm, 110 nm, 105 nm (nominal), 125 nm, 140 nm, 155 nm, 105 nm, 170 nm, 185 nm, 200 nm, 105 nm (nominal). The discs can be spun coat with material comprising transient optical state change security material, the pit depths incorporating the material determined, and pits of such dimensions analyzed for whether the impact upon read without the material when the optical medium is completed (metallized, lacquered etc.)

Detection from the laser-read side may be enhanced by including one or more deep pits in the substrate, such pits being made using a master designed to form multiple-depth pits. Detection may also be improved by optimizing pit geometry of the deep pits. Variable pit depth glass masters may be fabricated. For example, 350 nm thick photoresists and LBR power step series may be employed to produce different steps including nominal depth tracks for pseudo-random user data.

The pits may advantageously be placed only in the outer 5 mm of the disc, or in the lead out region of the disc. In such case, only the outer portion of the disc, or lead out region, need be coated.

The deep pits may also be used to form an interferometer by placement of the security material with respect to the deep pit prior to metallization.

EXAMPLE 7

Placement of Transient Optical State Change Security Material in Polycarbonate with Formation of Extended Pits Upon Molding Prior to Metallization to Form an Interferometer Along the Extended Pits The transient optical state change security material may incorporated into the polycarbonate and deep pits (bumps from the read side) flanking one or more lands molded into the polycarbonate at predetermined locations. The pits may be constructed to be of such depth that as to form an interferometer between the enlarged bumps, when viewed from the read side, that fail to reflect sufficiently for read by the PUH of the optical reader when the security material changes state due exposure to the incident read laser beam. This system therefore employs two components: the transient optical state change security material distributed throughout the polycarbonate, and a interferometer, of the Fabry-Perot type ("FPI").

The FPI works by varying the amount of light reflected back to a source. This variation is dependent on the intensity, angle and wavelength of the light entering the interferometer. The physical construction of an FPI, when viewed from the read-side, can be effectuated during the stamping procedure by creating one or more pits of extended depth flanking one or more lands. The glass master advantageously is modified to create such pits of extended depth. The deep pits act as the walls of the FPI, while the reflective land at the bottom acts as the primary reflective surface. By carefully selecting the transient optical phase change security material, under one set of conditions (intensity, wavelength, angle) there will be considerable reflectivity back to the source, while under a second set of conditions, there will be significantly less light reflected back to the source. These two states will be driven by the security material placed in the polycarbonate (PC).

If the interferometer is appropriately manufactured, and the transient optical state change security material chosen, the material in the PC will be essentially transparent to the PUH and all data will be read at one state. During the read, the material will absorb energy. When enough energy has been absorbed by the material its transmittance will decrease (less energy passes through) and it will cause a slight change in refractive index. In the second state with the transmittance decreased, if property designed, the input energy threshold for the FPI can be made to be crossed, and very little signal will be reflected. By carefully selecting the security material and its concentration in the PC, one can cause enough signal to the optical data structures so as to be able to read such data. One the other hand, if RI is changed when the material is activated by the read beam, the security material and its concentration, and the depths of the pits (from the non-read side) should be such as to result in a change in wavelength that crosses the FPI threshold resulting in a reduction in reflectivity, but the wavelength change should be small enough that normal sized optical data structures may still be resolved. It should be noted that the disc may have to be preformatted, such as is the case with CD-RW, if the automatic gain control (AGC) is inappropriately invoked based on ATIP information.

Placement of Transient Optical State Change Security Material Between Substrates Comprising the Optical Medium Dye may be deposited and encapsulated between substrates, for example an ambient protective polycarbonate, such as that produced by General Electric. Such placement eliminates optical hard coating, uses existing manufacturing processes, provides protection, and expands the possible dye chemistries that might be employed because read laser optical power density is, for example, greater at 0.6 rmn from the pit surface than at 1.2 rmn.

STATEMENT REGARDING PREFERRED EMBODIMENTS

While the invention has been described with respect to preferred embodiments, those skilled in the art will readily appreciate that various changes and/or modifications can be made to the invention without departing from the spirit or scope of the invention as defined by the appended claims. All documents cited herein are incorporated herewith to the extent not inconsistent with this disclosure.

What is claimed is:

1. A method comprising the steps of:
(a) disrupting the conjugation of a methylene blue analogeous dye molecule by crosslinking the methylene blue analogeous dye molecule with a substrate so as to constrain and shorten the methylene blue analogeous dye molecule and moving the light absorption of the methylene blue analogeous dye molecule to a higher energy level or shorter wavelength wherein the substrate is part of an optical medium.

2. A high definition DVD comprising a transient optical state change security dye composition which is cross-linked with a substrate affording a constraint on the planar structure of the dye shifting its light absorption capacity to about 400 run.

3. A compound capable of an absorption at 400 nm comprising formula II:

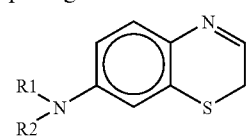

where the radicals R1 and R2 are electron withdrawing groups.

* * * * *